United States Patent [19]

Kandachi et al.

[11] Patent Number: 4,987,028
[45] Date of Patent: Jan. 22, 1991

[54] GLASS OR CERAMIC PLATE REINFORCED WITH FIBROUS OR FLAKY MATERIAL AND METHOD OF PRODUCING SAME

[75] Inventors: Takayoshi Kandachi; Nobuo Nakamura, both of Osaka, Japan

[73] Assignee: Central Glass Company, Limited, Ube, Japan

[21] Appl. No.: 262,345

[22] Filed: Oct. 25, 1988

[30] Foreign Application Priority Data

Oct. 26, 1987 [JP] Japan .................... 62-268200

[51] Int. Cl.$^5$ .......................... B32B 3/26; B32B 5/24
[52] U.S. Cl. ........................ 428/312.6; 428/312.2; 428/317.9; 428/328; 428/428; 501/11
[58] Field of Search ............ 428/204, 323, 324, 325, 428/328, 312.2, 312.6, 428, 443; 501/11, 36; 52/414

[56] References Cited

U.S. PATENT DOCUMENTS

| | | | |
|---|---|---|---|
| 3,546,061 | 12/1970 | Kraemer et al. | 428/428 |
| 4,066,723 | 1/1978 | King et al. | 264/256 X |
| 4,136,215 | 1/1979 | den Otter et al. | 427/204 |

FOREIGN PATENT DOCUMENTS 1151464 5/1969 United Kingdom .
1174292 12/1969 United Kingdom .
1575677 9/1980 United Kingdom .
2143812A 2/1985 United Kingdom .

Primary Examiner—George F. Lesmes
Assistant Examiner—Christopher Brown
Attorney, Agent, or Firm—Fleit, Jacobson, Cohn, Price, Holman & Stern

[57] ABSTRACT

A glass or ceramic plate, which may be foamed glass or ceramic plate, is reinforced by incorporating therein a thin reinforcement layer in which fibrous or flaky pieces of an inorganic heat-resistant reinforcing material such as, e.g., steel wire pieces 3 to 50 mm in length are scattered so as to be two-dimensionally randomly oriented. The reinforcement layer is parallel to two opposite major surfaces of the plate, and this layer is either a buried layer or a surface layer. The plate may have a plurality of reinforcement layers which are distant from each other. In any case the reinforcing material exists only in the reinforcement layer(s). The glass or ceramic plate can be produced by the steps of layering a particulate material of the glass or ceramic on a conveyor belt made of a heat-resistant material, scattering fibrous or flaky pieces of a reinforcing material on the surface of the layer of the particulate material, overlaying that surface with the particulate material if need be, and firing the material on the conveyor belt in a furnace.

9 Claims, 1 Drawing Sheet

GLASS OR CERAMIC PLATE REINFORCED WITH FIBROUS OR FLAKY MATERIAL AND METHOD OF PRODUCING SAME

BACKGROUND OF THE INVENTION

This invention relates to a glass or ceramic block or plate which is reinforced with pieces of an inorganic fibrous or flaky material and a method of producing same. The reinforced glass or ceramic plate is useful as a building or construction material.

It is known to produce a reinforced glass or ceramic block by dispersing pieces of an inorganic fibrous material over the entire volume of the block. For example, JP-A No. 60-36384 shows a foamed glass or ceramic block with pieces of a carbon fiber or a ceramic fiber dispersed therein.

In practice, however, it is difficult to uniformly disperse a fibrous reinforcing material in a glass or ceramic matrix. It is difficult to uniformly mix the reinforcing material, which is in the form of elongate pieces usually longer than 5 mm, with powdery or granular materials of the glass or ceramic primarily because the reinforcing material is very different from the particles or granules of the basic materials in shape, size and specific gravity. Another obstacle to uniform mixing is partial tangling of the elongate pieces of the reinforcing material. Also in mixing the reinforcing material with a melt of a glass, uniform mixing is difficult because of the difference in specific gravity and partial tangling of the elongate pieces of the reinforcing material. Consequently, the fibrous reinforcing material is often dispersed unevenly in the resultant glass or ceramic block such that in some sections of the block the reinforcing effect is considerably lower than in other sections.

SUMMARY OF THE INVENTION

It is an object of the present invention to provide a reinforced glass or ceramic plate which uses a fibrous or flaky reinforcing material but is free from the above described problems of non-uniform mixing of the reinforcing material with the glass or ceramic.

It is another object of the invention to provide an industrially advantageous method for producing a reinforced glass or ceramic plate according to the invention.

According to the invention there is provided a plate of a fired inorganic nonmetallic material, comprising a thin reinforcement layer in which fibrous or flaky pieces of an inorganic heat-resistant reinforcing material are scattered over substantially the entire area of a lateral section of the plate, the reinforcement layer being parallel to two opposite major surfaces of the plate and contiguous to at least one layer of the fired inorganic nonmetallic material not containing the reinforcement material.

The fired inorganic nonmetallic material is a glass, ceramic or glass-ceramics and may be a foamed material. In the case of a ceramic, it may be pottery or porcelain, and the plate may be in the form of a brick or a tile. The proportion of the plate thickness to the plate widths is not limited.

For example, the reinforcing material is a steel wire or a mineral material such as wollastonite or shale.

In a glass or ceramic plate according to the invention, fibrous or flaky pieces of a reinforcing material are scattered on a major surface or a lateral section of the plate instead of dispersing the same pieces in the whole volume of the plate. The fibrous or flaky pieces of the reinforcing material firmly bond to the glass or ceramic phase and serve the function of binding and anchoring the glass or ceramic phase. In the reinforcement layer the elongate pieces of the reinforcing material are two-dimensionally randomly oriented to lie substantially parallel to the major surfaces of the plate. This is favorable for suppression of cracking of the plate by the action of external force or heat. This invention obviates the difficulties in uniformly mixing a fibrous or flaky reinforcing material with a powdery or granular material of a glass or ceramic and uniformly dispersing the reinforcing material in the whole volume of a glass or ceramic plate. Furthermore, sufficient reinforcement can be attained by using a smaller quantity of reinforcing material than in the case of dispersing the reinforcing material in the whole volume of the glass or ceramic plate.

A glass or ceramic plate according to the invention may have a plurality of reinforcement layers each of which is as stated above.

One of the known methods for reinforcing a glass or ceramic plate is embedding metal rods or a wire netting in the plate parallel to the major surfaces of the plate. However, the reinforced plate is liable to suffer cracking at the interfaces between the embedded metal members and the glass or ceramic matrix because of thermal expansion or shrinkage of the metal members which are large in volume and considerably different in thermal expansion coefficient from the surrounding glass or ceramic. The present invention is free from such a disadvantage.

Reinforced glass or ceramic plates according to the invention are advantageously useful as building and construction materials and can easily be produced on an industrial scale by using simple apparatus.

For industrially producing a reinforced glass or ceramic plate according to the invention it is favorable to use a conveyor belt which is made of a heat-resistant material and runs horizontally to pass through a furnace for firing the material of the glass or ceramic.

For producing a glass or ceramic plate according to the invention, a preferred method comprises the steps of (a) pouring a particulate material of the glass or ceramic onto the aforementioned conveyor belt so as to layer the particulate material on the belt, (b) scattering fibrous or flaky pieces of an inorganic heat-resistant reinforcing material on the surface of the layer of the particulate material, and (c) introducing the particulate material layered on the belt and scattered with the reinforcing material into a furnace and, in the furnace, firing the particulate material on the belt.

In the case of producing a glass or ceramic plate having a reinforcement layer according to the invention as a buried layer, the above method further comprises, between the steps (b) and (c), the step of overlaying the surface scattered with the pieces of the reinforcing material with the particulate material of the glass or ceramic.

DESCRIPTION OF THE PREFERRED EMBODIMENTS

Figure 1:
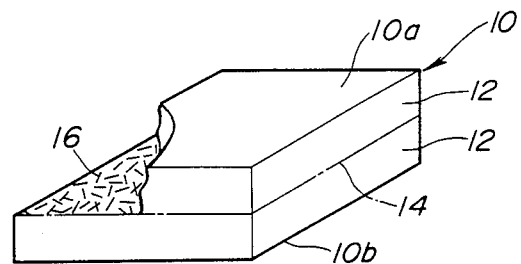
FIG. 1 is a perspective and partially cutaway view of a reinforced foamed glass plate as an embodiment of the present invention.

As an embodiment of the invention FIG. 1 shows a foamed glass plate 10. Basically this plate 10 is formed of a foamed glass 12 containing no reinforcing filler. However, as a thicknesswise middle section of the plate 10 there is a thin reinforcement layer 14 in which steel wire pieces 16 are scattered over the entire sectional area of the plate 10. The reinforcement layer 14 is parallel to the front and back surfaces 10a, 10b of the foamed glass plate 10, and within this layer 14 the wire pieces 16 are dispersed and two-dimensionally randomly oriented. That is, each wire piece 14 lies parallel to or nearly parallel to the surfaces 10a, 10b. When a foamed glass plate cracks by the action of external force or heat, most of the cracks develop in the direction thicknesswise of the plate 10. Therefore, the reinforcement layer 14 disposed perpendicular to the thickness of the plate 10 is effective for protecting the foamed glass 12 against cracking and, even if cracking occurs, suppressing development of the cracks.

The reinforcing material 16 is not limited to steel wire pieces. Pieces of a different metal wire can alternatively be used. It is desirable to use a corrosion resistant metal wire, and in this sense a ferritic chromium stainless steel wire is preferred among steel wires. It is also possible to use a heat-resistant nonmetallic fibrous material such as wollastonite or asbestos or a heat-resistant nonmetallic foliaceous or flaky material such as shale flakes, chlorite flakes or mica flakes.

Preferably the length of each individual piece or particle 16 of the fibrous or flaky reinforcing material falls in the range from 3 to 50 mm. If the length is shorter than 3 mm the reinforcing material is insufficient in the expected effect of binding and anchoring the glass or ceramic phase 12. However, the effect cannot unlimitedly be augmented by using longer pieces, and in this regard there is little merit in using reinforcing pieces longer than 50 mm. Rather, such long pieces are undesirable because at the stage of cooling the reinforced glass or ceramic plate there arises a considerable difference between lengthwise shrinkage of each piece 16 and shrinkage of the surrounding glass or ceramic 12 possibly with the result that a minute crack or interstice appears at the interface between the elongate piece and the glass or ceramic phase.

It is desirable that each individual piece 16 of the fibrous or flaky reinforcing material has an aspect ratio in the range from 20 to 300. Herein the term aspect ratio means the ratio of the length of a fibrous or flaky piece to its diameter, in the case of a fibrous piece, or to its thickness in the case of a flaky piece. Fibrous or flaky pieces less than 20 in aspect ratio are low in pliability and hence in the binding and anchoring effect. When the aspect ratio is greater than 300, fibrous or flaky pieces are too thin in a relative sense and hence are liable to break by the action of external force.

The quantity of the reinforcing material 16 per unit area of the reinforcement layer 14 is not strictly specified, and an optimum quantity is variable depending on the particulars of the pieces of the reinforcing material such as specific gravity, length, diameter or thickness and aspect ratio. For example, in the case of steel wire pieces which are about 8 in specific gravity, 10–50 mm in length, 50–200 in aspect ratio, it is suitable to use 100 to 700 g of wire pieces per 1 $m^2$ of the reinforcement layer 14.

The location of the reinforcement layer 14 can arbitrarily be chosen. That is, the reinforcement layer 14 is not necessarily distant from both the front and back surfaces 10a and 10b of the glass or ceramic plate 10 and may be provided on or close to either of the front or back surfaces 10a, 10b. In some cases it is unfavorable that the reinforcement layer occupies the front or back surface of the reinforced glass or ceramic plate because of an unbeautiful appearance of the scattered reinforcing material or because of the possibility of corrosion of wire pieces employed as the reinforcing material by exposure to the environmental atmosphere. In such cases, the demerits can be obviated by burying the reinforcement layer in the glass or ceramic plate at a depth of at least a few millimeters from the front or back surface.

A glass or ceramic plate according to the invention may have a plurality of reinforcement layers which are distant from and parallel to each other, and in such a case it is not necessary to use the same fibrous or flaky material in all the reinforcement layers.

Figure 2:
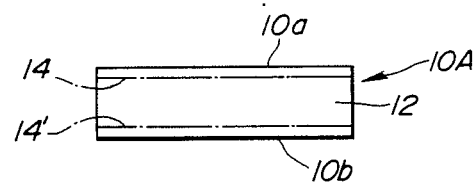
FIG. 2 is a side view of another reinforced foamed glass plate embodying the invention.

FIG. 2 shows a foamed glass plate 10A having a reinforcement layer 14 at a short distance from the top surface 10a and another reinforcement layer 14' at a short distance from the back surface 10b. For example, steel wire pieces are scattered in each of the two reinforcement layers 14 and 14' in the same manner as in the reinforcement layer 14 in FIG. 1. The thus reinforced foamed glass plate 10A is very resistant to bending force, mechanical shocks, thermal shocks and open flames.

In embodying the invention in a foamed glass plate, it is optional to produce a multilayer plate by inseparably covering one or each major surface of a foamed glass layer with either a dense (unfoamed) glass or ceramic layer or a crust layer formed of a foamed glass or ceramic relatively low in porosity. The multi-layer glass plate has a reinforcement layer in either of the foamed glass layer and an overlying layer or at the interface between the two layers and may optionally have another or additional reinforcement layer(s).

A reinforced glass or ceramic plate according to the invention is produced by the steps of layering a powdery, granular or plastic material of the glass or ceramic, scattering pieces of a fibrous or flaky reinforcing material on the surface of the glass or ceramic material layer, further layering the glass or ceramic material on the surface scattered with the reinforcing material to thereby bury the reinforcing material in a layer of the glass or ceramic material, and firing the whole layer of the material. In industrial practice it is advantageous to accomplish layering of the glass or ceramic material and scattering of the reinforcing material on a conveyor belt which runs through a furnace for firing the layered material.

Figure 3:
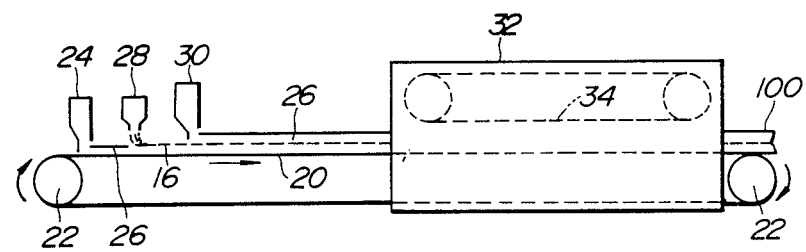
FIG. 3 is a schematic illustration of an apparatus used in producing a reinforced foamed glass plate of the type shown in FIG. 1.

For example, the foamed glass plate 10 of FIG. 1 can be produced by using an endless conveyor belt 20 shown in FIG. 3. The belt 20 is made of a steel and driven by pulleys 22 to run through a furnace 32. A first hopper 24 is positioned such that its discharge opening is at a short distance from the upper surface of the belt 20. The discharge opening of the hopper 24 is nearly equal in width to the belt 20. The material of the foamed glass 12 in FIG. 1 is essentially a powdery or granulated mixture of a glass powder and a foaming agent. Using the hopper 24 the powdery or granulated material, indicated at 26, is poured onto the running conveyor belt 20 to layer on the belt 20. Using a second hopper 28 located between the first hopper 24 and the furnace 32, steel wire pieces 16 are scattered on the layer of the foam glass material 26. Then, using a third hopper 30 located between the second hopper 28 and the furnace 32 the material 26 of the foamed glass is poured onto the surface scattered with the steel wire pieces 16 to thereby bury the scattered wire pieces 16 in a layer of the powdery or granular material 26, and that layer of the powdery or granular material 26 is carried into the furnace 32. The firing in the furnace 32 causes melting and foaming of the material 26. In the furnace 32 there is an endless steel belt 34, and during the firing operation this belt 34 is run so as to press the upper surface of the glass layer on the conveyor belt 20. During this process the steel wire pieces 16 bond to the foamed glass. The foamed and unsolidified glass plate 100 is carried out of the furnace 32 and into an annealing furnace (not shown). After annealing the foamed glass plate (10) having the reinforcement layer 14 is cut into desired sizes.

A multilayer glass plate according to the invention can also be produced by using an apparatus of the type shown in FIG. 3. For example, a multilayer foamed glass plate which is fundamentally a laminate of a crust layer formed of a foamed glass relatively low in porosity, a core layer which is a foamed glass layer relatively high in porosity and another crust layer and has a reinforcement layer at the interface between the core layer and each crust layer is produced in the following way. The material of the core layer is as mentioned above with respect to the manufacture of the foamed glass plate of FIG. 1. The material of the crust layers is a powdery or granulated mixture of a glass powder and a very small amount of a foaming agent. First the material of the crust layer is poured onto the conveyor belt 20 to layer on the belt, and pieces of a fibrous or flaky reinforcing material such as a steel wire are scattered on the surface of the layered material. Then the material of the core layer is poured and layered on the surface scattered with the reinforcing material. Next, pieces of the reinforcing material are scattered on the layer of the core material, and the material of the crust layer is poured and layered on the surface scattered with the reinforcing material. After that the materials in layers are fired in the furnace 32.

EXAMPLE 1

A foamed glass plate of the type shown in FIG. 1 was produced by the method described with reference to FIG. 3. The material of the foamed glass 12 was a mixture of a soda lime glass powder and calcium carbonate powder used as a foaming agent. As the reinforcing material 16, ferritic chromium stainless steel wire pieces were used. Each wire piece was 5 mm in length and 20 in aspect ratio. Using the conveyor belt 20 and the three hoppers 24, 28 and 30, the material of the foamed glass and the wire pieces were respectively fed so as to produce a foamed glass plate (10) which had a thickness of 30 mm and contained the steel wire pieces 16 scattered only in a single reinforcement layer 16 at a distance of 5 mm from the back surface 10b. The quantity of the wire pieces 16 in the foamed glass plate was 16.80 kg/m$^3$, and the foamed glass plate had an apparent specific gravity of 1.0.

Samples of the obtained foamed glass plate were broken to examine the manner of scattering of the steel wire pieces 16 in the reinforcement layer. In every sample the steel wire pieces were well and uniformly dispersed over the entire sectional area and were two-dimensionally randomly oriented.

Separately, 45-cm square specimens of the foamed glass plate were subjected to a falling weight impact test. Each specimen was placed horizontally by supporting the back surface 10b along two opposite sides, and a steel ball having a mass of 1 kg was dropped onto the front surface 10a from a variable height. By this test, the impact break strength of the foamed glass plate was 50 kg.cm.

EXAMPLES 2-4

In these examples the foamed glass plate of Example 1 was modified, as shown in the following table, in the length and aspect ratio of the steel wire pieces and the quantity of the steel wire pieces contained in the glass plate. As a further modification the foamed glass plate of Example 4 had another reinforcement layer at a distance of 5 mm from the front surface 10a. That is, the foamed glass plate of Example 4 was of the type shown in FIG. 2. In this example the two reinforcement layers were created identically by using equal quantities of the same steel wire pieces.

Observation of broken samples of the foamed glass plates of Examples 1-4 revealed that in every reinforcement layer the steel wire pieces were uniformly dispersed and two-dimensionally randomly oriented. The results of the falling weight impact test on these foamed glass plates were as shown in the table.

COMPARATIVE EXAMPLES 1-3

In each of Comparative Examples 1 to 3, a foamed glass plate containing ferritic chromium steel wire pieces was produced by using a mixture of the material of the foamed glass used in Example 1 and the steel wire pieces. The mixture was layered on the conveyor belt 20 in FIG. 3 and, in that state, fired in the furnace 32. As a natural consequence, the wire pieces were dispersed in the foamed glass plate over the whole thickness. The particulars of the steel wire pieces used in the respective comparative examples are shown in the table. In every example the foamed glass plate had a thickness of 30 mm and apparent specific gravity of 1.0.

Samples of these foamed glass plates were broken to examine the manner of dispersion of the steel wire pieces. In the foamed glass of Comparative Example 1 some unevenness was observed in the dispersion of the wire pieces in the matrix of foamed glass, and the wire pieces were not wholly randomly oriented. In Comparative Examples 2 and 3 the wire pieces were unevenly dispersed and were not randomly oriented, and some of the wire pieces were tangled with each other. The falling weight impact test on these foamed glass plates gave the results shown in the table. These foamed glass plates were very much lower in the break strength than the foamed glass plates of Examples 1-4 though every foamed glass plate contained nearly the same quantity of steel wire pieces.

| | Steel Wire Pieces | | | Manner of Introducing Steel Wire Pieces into Foamed Glass | Falling Weight Impact Break Strength (kg·cm) |
|---|---|---|---|---|---|
| | Length (mm) | Aspect Ratio | Quantity (kg/m³) | | |
| Ex. 1 | 5 | 20 | 16.80 | scattered in one layer | 50 |
| Ex. 2 | 15 | 50 | 16.60 | scattered in one layer | 60 |
| Ex. 3 | 45 | 250 | 17.20 | scattered in one layer | 55 |
| Ex. 4 | 25 | 50 | 16.60 | scattered in two layers | 70 |
| Comp. Ex. 1 | 10 | 30 | 16.80 | dispersed in whole volume of foamed glass | 20 |
| Comp. Ex. 2 | 30 | 100 | 16.80 | dispersed in whole volume of foamed glass | 13 |
| Comp. Ex. 3 | 45 | 250 | 16.80 | dispersed in whole volume of foamed glass | 10 |

What is claimed is:

1. A plate of a fired inorganic non-metallic material, comprising a thin reinforcement layer in which pieces of a ferritic chromium stainless steel wire are scattered over substantially the entire area of a laterally section of the plate, said reinforcement layer being parallel to two opposite surfaces of the plate and distant from said major surfaces, said steel wire pieces lying substantially parallel to said major surfaces and being two dimensionally randomly oriented, wherein the length of each of said pieces of wire is from 3 to 50 mm and the ratio of the length of each of said pieces to the diameter of the same piece is from 20 to 300.

2. A plate according to claim 1, wherein said fired inorganic nonmetallic material is a glass.

3. A plate according to claim 2, wherein said glass is a foamed glass.

4. A plate according to claim 3, further comprising a surface layer formed of another foamed glass which is lower in porosity than said foamed glass.

5. A plate according to claim 3, further comprising a surface layer formed of unfoamed glass.

6. A plate according to claim 1, wherein said fired inorganic nonmetallic material is a ceramic.

7. A plate according to claim 6, wherein said ceramic is a foamed ceramic.

8. A plate according to claim 1, wherein said fired inorganic nonmetallic material is a glass-ceramics.

9. A plate according to claim 1, wherein said reinforcement is at a relatively short distance from one major surface of the plate, the plate comprising another reinforcement layer, which is parallel at a relatively short distance from the opposite major surface of the plate and in which pieces of a ferritic chromium stainless steel wire are scattered, wherein the length of each of said pieces of wire is from 3 to 50 mm and the ratio of the length of each of said pieces to the diameter of the same piece is from 20 to 300.

* * * * *